US012454447B2

(12) United States Patent
Kritzer

(10) Patent No.: US 12,454,447 B2
(45) Date of Patent: Oct. 28, 2025

(54) TWO POST LIFT WITH REVERSIBLE OFFSET TELESCOPING LIFT ARMS

(71) Applicant: BendPak, Inc.

(72) Inventor: Jeffrey S. Kritzer, Moorpark, CA (US)

(73) Assignee: BendPak, Inc., Agoura Hills, CA (US)

( * ) Notice: Subject to any disclaimer, the term of this patent is extended or adjusted under 35 U.S.C. 154(b) by 0 days.

(21) Appl. No.: 18/627,902

(22) Filed: Apr. 5, 2024

(65) Prior Publication Data

US 2024/0246796 A1 Jul. 25, 2024

Related U.S. Application Data

(63) Continuation of application No. 18/181,670, filed on Mar. 10, 2023, now abandoned.

(60) Provisional application No. 63/269,356, filed on Mar. 15, 2022.

(51) Int. Cl.
*B66F 7/28* (2006.01)
*B66F 3/46* (2006.01)
*B66F 7/20* (2006.01)

(52) U.S. Cl.
CPC .................. *B66F 7/28* (2013.01); *B66F 3/46* (2013.01); *B66F 7/20* (2013.01)

(58) Field of Classification Search
CPC ................. B66F 7/28; B66F 7/20; B66F 3/26
See application file for complete search history.

(56) References Cited

U.S. PATENT DOCUMENTS 4,212,449 A * 7/1980 Tsujimura ................. B66F 7/04 187/219
5,046,880 A 9/1991 Steinhilber
5,727,656 A * 3/1998 Gaudioso .................. B66F 7/02 254/89 R
5,915,500 A 6/1999 Weaver
6,279,685 B1 8/2001 Kogan et al.
6,866,124 B1 3/2005 Barkis
9,150,395 B2 10/2015 Kritzer
9,550,658 B2 * 1/2017 Uhl ........................... B66F 7/10
9,821,989 B2 11/2017 Uhl et al.
9,902,599 B1 * 2/2018 Veresko .................... B66F 7/10
10,077,178 B2 9/2018 Benz
10,173,873 B2 * 1/2019 Horimizu ............. G01B 11/272
10,710,852 B2 7/2020 Ferrone
11,401,143 B2 * 8/2022 Benz ......................... B66F 7/28
12,030,756 B2 * 7/2024 Murru ....................... B66F 7/04
12,071,330 B2 * 8/2024 Huber ....................... B66F 7/28
2005/0235460 A1 10/2005 Stewart
(Continued)

FOREIGN PATENT DOCUMENTS

DE 2615074 A1 10/1977
DE 20206720 U1 8/2002
(Continued)

*Primary Examiner* — Anna M Momper
*Assistant Examiner* — Michelle M Mudwilder
(74) *Attorney, Agent, or Firm* — AVEK IP, LLC; Kent R. Erickson

(57) ABSTRACT

A telescoping lift arm for a two-post vehicle lift has pivot structure radially offset from a longitudinal axis of the arm. An outer arm section is open at a distal end to enable an inner arm section to be retracted therethrough. A pair of the arms are bilaterally symmetrical and configured to be removable from lift carriages to enable lateral swapping of the arms.

4 Claims, 9 Drawing Sheets

(56) References Cited

U.S. PATENT DOCUMENTS

| | | | | |
|---|---|---|---|---|
| 2012/0325587 | A1 | 12/2012 | Matthews et al. | |
| 2013/0233651 | A1* | 9/2013 | Kritzer | B66F 3/46 187/208 |
| 2015/0232308 | A1* | 8/2015 | Uhl | B66F 7/20 254/89 R |
| 2019/0276287 | A1 | 9/2019 | Huber et al. | |
| 2020/0079627 | A1 | 3/2020 | Perlstein | |
| 2020/0115206 | A1 | 4/2020 | Benz | |
| 2020/0148517 | A1 | 5/2020 | Nussbaum et al. | |
| 2021/0114852 | A1* | 4/2021 | Heath | B66F 7/28 |
| 2021/0387838 | A1 | 12/2021 | Green et al. | |
| 2022/0106173 | A1 | 4/2022 | Huber et al. | |
| 2022/0219958 | A1* | 7/2022 | Taylor | B66F 17/00 |
| 2023/0011902 | A1 | 1/2023 | Denzik et al. | |

FOREIGN PATENT DOCUMENTS

| | | | | |
|---|---|---|---|---|
| EP | 1156009 | A1 | 11/2001 | |
| EP | 1357079 | A2 | 10/2003 | |
| EP | 3770104 | A1 | 1/2021 | |
| WO | WO-2014127238 | A2 * | 8/2014 | B66F 7/20 |
| WO | 2020072726 | A1 | 4/2020 | |
| WO | 2020230079 | A1 | 11/2020 | |

* cited by examiner

TWO POST LIFT WITH REVERSIBLE OFFSET TELESCOPING LIFT ARMS

CROSS-REFERENCE TO RELATED APPLICATIONS

This application is a Continuation of U.S. patent application Ser. No. 18/181,670 filed Mar. 10, 2023 which claims benefit of U.S. Provisional Patent Application No. 63/269,356, filed Mar. 15, 2022, the disclosures of which are hereby incorporated herein in their entirety by reference.

BACKGROUND OF THE INVENTION

Field of the Invention

This invention relates to automobile service lifts and, more particularly, to a two post lift arrangement in which each post has a pair of pivoting telescoping lift arms, one of which is radially offset from a pivot axis thereof.

Background & Description of Related Art

A wide variety of post-type automobile lifts have been previously known and used in automobile maintenance and repair to provide access to components on the lower or undersides of vehicles such as tires, brakes, exhaust components, and the like for inspection, repair, and replacement purposes. Post lifts can be in-ground varieties with some components below the floor surface of the shop or above-ground varieties which are mounted on the floor. In-ground post lifts usually have one or two vertically ascending columns mounted below the floor of a service facility, such as a garage, shop, or the like that are raised hydraulically or pneumatically to lift the vehicle. Above-ground post lifts generally have two or four vertical columns or posts, each of which includes a carriage that rides up and down the post. Each of the carriages of a two post lift includes a pair of inwardly extending lift arms with a vehicle engagement structure, such as lift pads, at ends thereof that engage lift points or locations on the underside of a body or frame of a vehicle to be lifted. The lift arms are adjusted in length and angular position to engage front and back and left and right lift points of the vehicle.

The vehicle lift arms are typically formed of telescoping sections which are pivotally connected to the lift carriage that is slidably mounted on the post and selectively movable vertically on the post by an actuator, such as a pressurized fluid cylinder connected between the lift carriage and the post. The telescoping lift arm sections enable adjustment of the lengths of the lift arms, and the pivotal connection of the arms to the lift carriage enables adjustment of the angles thereof to allow the lift system to accommodate a variety of vehicle sizes and proportions.

The lengths of the lift arms and their angular positions relative to the lift carriage are usually adjusted manually by a mechanic to position the lift pads for engagement with particular lift points of the vehicle. Once the weight of the vehicle is supported by the lift arms, friction between adjacent telescoping sections usually prevents changes in the lengths of the lift arms. However, it is generally preferred to fix the angular position of the lift arms prior to lifting.

A common lift arm angle locking mechanism includes an arcuate or curved movable or rotatable lock member mounted on an inner end of the lift arm which cooperates with a rotationally fixed position lock member mounted on the lift carriage. A typical movable lock member has circumferentially spaced teeth projecting radially outwardly about a pivot pin of the arm and has the appearance of a sector of a spur gear. The fixed lock member has an inwardly curved, toothed surface and is mounted on a lock pin. The lock pin is slidably mounted on the lift carriage and is urged by a spring toward a lowered locking position with the fixed lock engaging the movable lock. The lock pin may have a lever, handle, ring, or the like which is grasped by a mechanic to raise the lock pin to thereby retract the fixed lock member out of engagement with the movable lock member to enable pivoting of the lift arm. Representative types of such vehicle lift arm locking mechanisms are disclosed in U.S. Pat. No. 9,150,395 and U.S. Publication No. 2021/0331904, the disclosures of which are incorporated herein in their entirety by reference.

A typical telescoping lift arm has an outer arm section which is pivotally connected to the lift carriage by a pivot pin. The lift arm may include a middle arm section telescoped within the outer arm section and may also include an inner arm section telescoped within the middle arm section. For this reason, the middle and inner arm sections have progressively smaller cross-sectional dimensions than the outer arm sections and, thus, may be progressively weaker to the cantilever loads the lift arm is intended to support in lifting a vehicle. Accordingly, extension of the sections of a lift arm is typically limited, as by engagement of extension stop members on the arm sections, to thereby limit the cantilever load on the arm sections. Retraction of the arm sections may also be limited by engagement of respective retraction stop members. In a typical telescoping lift arm, retraction of the middle and inner sections is ultimately limited by contact of their inner ends with a pivot structure within the lift arm.

When a vehicle is to be lifted by a two-post lift system for inspection or service, the arms of the lift carriages are pivoted out of the way to enable the vehicle to be driven to a position approximately centered between the posts, to balance loading of the lift arms. The vehicle must be positioned relative to the post and lift arms to enable the driver to open the car door to exit the vehicle or to enter the vehicle to move it out of the lift system. For this reason, the lift arms which engage the front end of the vehicle may be shorter than the arms which engage the rear end. The vehicle must also be positioned so that the lift arms can be extended or retracted and angled to position the lift pads beneath the lift points of the vehicle. Angular movement of the lift arms is usually limited by contact of components of the lift arms with components of the lift carriage or the other lift arm connected to the lift carriage. Thus, a wide degree of angular positioning and length adjustment of the lift arms is desirable to enable beneficial use of a two post lift system to service the wide ranges of sizes and configurations of vehicles in present use.

SUMMARY OF THE INVENTION

The present invention provides embodiments of two post vehicle lift systems with telescoping lift arms which are configured to improve the range of extension and retraction of the lift arms and the range of angular movement of the lift arms.

The present invention provides embodiments of an offset telescoping lift arm assembly for use on a vehicle lift system including an upstanding post having a lift carriage slidably engaged therewith and movable therealong, the lift arm assembly comprising: a tubular first arm section having an open first proximal end and an open first distal end opposite the first proximal end; the first arm section being pivotally engaged with the lift carriage near the first proximal end at a radially offset distance from a first arm pivot axis about which the first arm section is to pivot; a second arm section telescopically received within the first arm section to enable extension therefrom and retraction therethrough, the second arm section having a second proximal end and a second distal end opposite the second proximal end; and the second proximal end of the second arm section extending out of the first proximal end of the first arm section when the second arm section is fully retracted through the first arm section. The second arm section may be longer than the first arm section. The lift arm assembly may include a third arm section telescopically received within the second arm section and having a third distal end with a vehicle contact member positioned thereon.

Embodiments of the offset lift arm assembly include: a pivot member engaged with the lift carriage to enable pivoting about the first arm pivot axis and a pivot support member extending from the first arm section and engaged with the pivot member to enable pivoting the first arm section about the first pivot axis. The pivot member may be configured to enable removal from engagement with the lift carriage and the pivot support member to enable removal of the arm assembly from the lift carriage. Embodiments of the offset lift arm assembly include: a rotation lock engaged between the lift carriage and the first arm section to prevent pivoting of the first arm section about the first arm pivot axis, the rotation lock being selectively releasable to enable pivoting the first arm section about the first arm pivot axis.

In some embodiments of the present invention, the offset lift arm assembly is a front lift arm for engagement with a front end of a vehicle and is combined with a telescoping rear arm assembly for engaging a rear end of a vehicle and pivotally engaged with the lift carriage for pivoting about a rear arm pivot arm axis spaced from the first arm assembly pivot axis, the rear arm assembly telescopically extending and retracting along a rear telescoping axis substantially aligned with the rear arm pivot axis.

In some embodiments of the present invention, the post, lift carriage, and lift arm assembly form a first lift unit incorporated in a two post vehicle lift system which includes a second lift unit laterally spaced from the first lift unit and including a second post, a second lift carriage, and a second lift arm assembly, and wherein: the second lift arm assembly is pivotally engaged with the second lift carriage at a radially offset distance from a second pivot axis about which the second lift arm assembly is to pivot; and the lift arm assemblies are configured to enable selective lateral swapping of the lift arm assemblies between the posts. In particular, embodiments of the first and second lift arm assemblies are substantially bilaterally symmetrical with one another.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
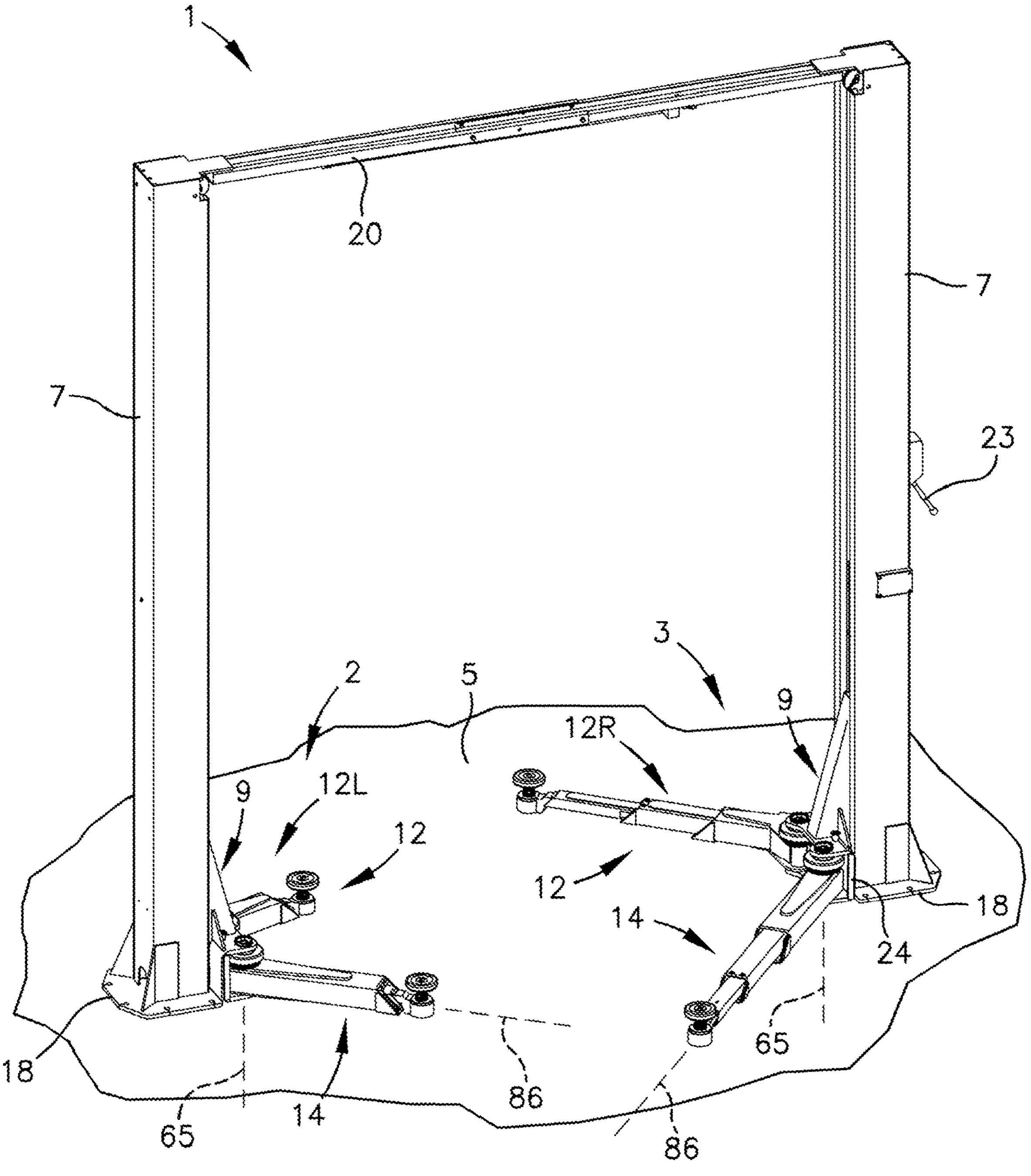
FIG. 1 is a perspective view of a two-post vehicle lift system which incorporates offset lift arms according to the present invention.

Referring to the drawings in more detail, the reference number 1 generally designates an embodiment of a two post vehicle lift system, each post having a reversible offset telescoping lift arm assembly according to the present invention. Referring to FIG. 1, the system 1 generally includes a pair of vehicle lift units, a left hand or left lift unit 2 and a right hand or right lift unit 3 positioned in mutually facing, laterally spaced relation on a floor 5 of a vehicle service facility, such as a garage, shop, or the like. Each of the lift units 2 and 3 includes an elongated upstanding post 7 having a vehicle lift carriage assembly or carriage 9 slidably engaged therewith and movable therealong, configured to enable lifting and lowering of a vehicle, for inspection, service, or the like. Each of the lift carriages 9 has a pair of telescoping vehicle lift arms 12 and 14, including the telescoping front lift arm assembly 12 configured for engaging a front end of the vehicle and the telescoping rear lift arm assembly 14 configured for engaging a rear end of the vehicle, pivotally mounted thereon to enable positioning for engagement with the vehicle to be lifted.

The illustrated left and right posts 7 are supported by base plates 18 secured to the shop floor, as by a plurality of bolts (not shown) spaced about a periphery of the base plate 18. Upper ends of the posts 7 may be connected by a trough structure 20 which reinforces the lift system 1 and provides a means of routing control lines (not shown) between the lift units 2 and 3. The lift carriage 9 of each lift unit is translated vertically along the post 7 by operation of a linear motor or actuator, such as a hydraulic cylinder 22 (FIG. 2) connected between the post 7 and the carriage 9. The operation of the actuators 22 is controlled by a lift control member 23 located on at least one of the posts 7. The illustrated carriage 9 is formed by a double ended lift arm support clevis 24 secured thereto at a lower end thereof. The carriage clevis 24 may be formed by a clevis bottom plate 30 (FIG. 3) having an inverted L-shaped clevis bracket 32 joined thereto to form a generally C-shaped structure. The illustrated clevis bracket 32 has a vertical clevis side plate 33 and a horizontal clevis top plate 34. The illustrated clevis 24 has openings in the top plate 34 and bottom plate 30 to receive vertically oriented lift arm pivot pins or pivot members 38 (FIG. 6) on which the lift arms 12 and 14 pivot.

The lift units 2 and 3 are substantially similar and may be designated as a left hand lift unit 2 and a right hand unit 3. The lift arms 12 and 14 may be generally similar in construction and operation and may be designated as a front lift arm 12 and a rear lift arm 14. Thus, description of most components and interaction thereof for the rear lift arm 14 corresponds to similar components of the front lift arm 12.

Figure 2:
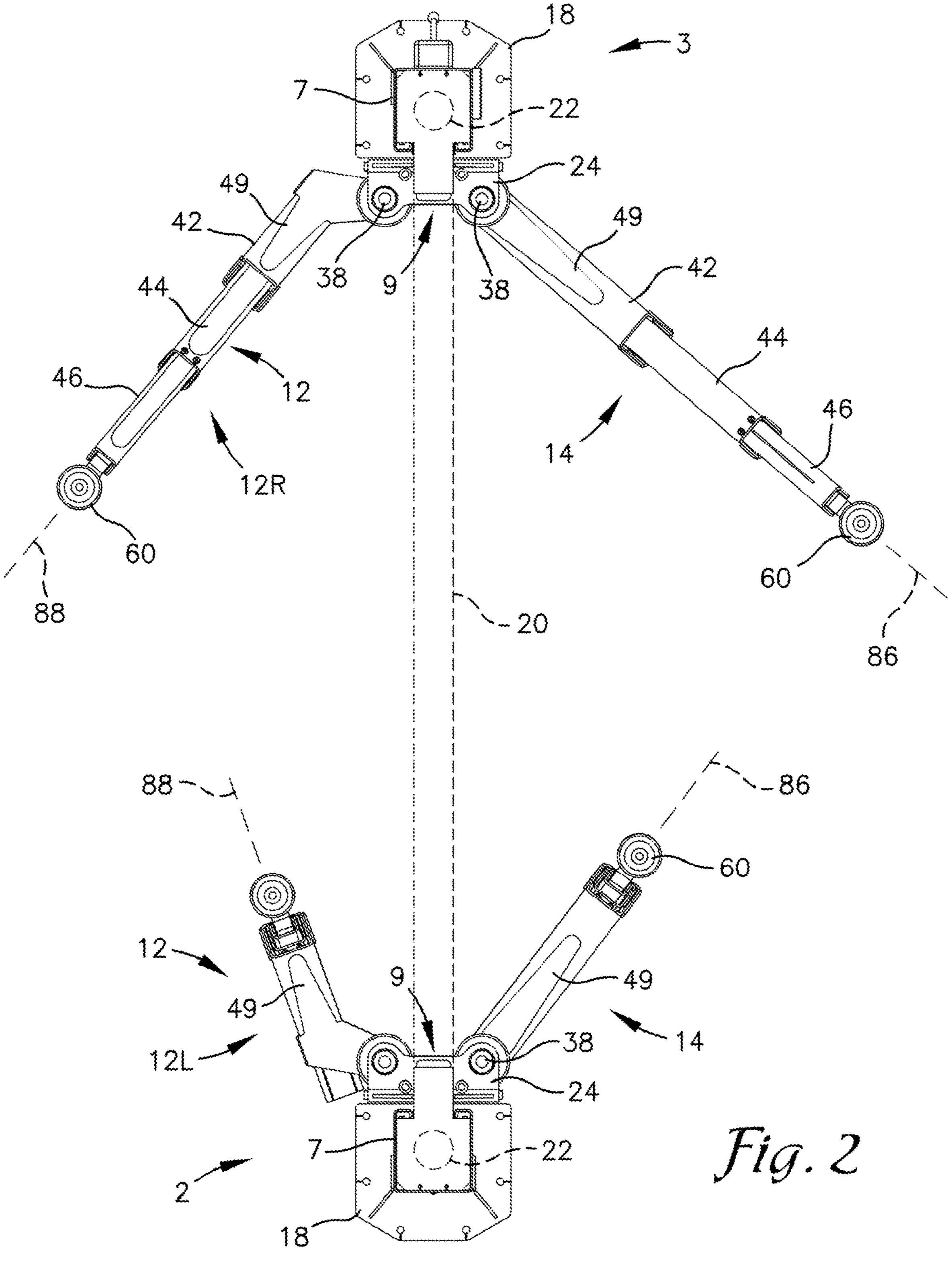
FIG. 2 is an enlarged fragmentary plan view of the lift system with a trough assembly thereof shown in phantom lines.

Referring to FIG. 2, each of the illustrated telescoping lift arm 12 or 14 includes a first or outer lift arm section 42, a second or middle lift arm section 44, and a third or inner lift arm section 46. The middle arm section 44 is sleeved within the outer arm section 42, and the inner arm section 46 is sleeved within the middle arm section 44. Preferably, the middle arm section 44 is telescopically received within the outer arm section 42 to enable extension therefrom and retraction therethrough, and the inner arm section 46 is telescopically received within the middle arm section 44 to enable extension therefrom and retraction therethrough.

The lift arm sections 42, 44, and 46 may be formed of lengths of rectangular or square cross section tubular beams of appropriate sizes or may be built up from components such as channels, plates, and the like which are joined, as by welding. The outer arm section 42 may be reinforced by an upper stiffener 49 and a lower stiffener 50 (see FIG. 6) joined, respectively, to an upper surface and a lower surface of the outer arm section 42. A distal end 52 of the inner arm section 46 is provided with a vehicle contact member or lift pad adapter 56 configured to receive a lift pad 60 positioned at a top end thereof. The lift pad 60 may include one or more extensions (not shown) to position the lift pad 60 at a desired height. The lift pad 60 forms a contact element between the lift arms 12 or 14 and lift points of a vehicle to be lifted.

The lift arms 12 and 14 are pivotally connected to the carriage clevis 24 of the lift carriage 9 for pivoting about respective vertical lift arm pivot axes, including left and right front pivot axes 63 (FIGS. 3 and 4) and left and right rear pivot axes 65 (FIG. 1), respectively. In one embodiment, each front pivot axis 63 is spaced apart from each rear pivot axis 65. In the illustrated arm 12, a lift arm pivot tube or bushing 67 (FIGS. 5 and 6) extends through the upper and lower walls of the outer arm section 42 of the front arms 12 and between the upper and lower stiffeners 49 and 50, as will be described further below. The pivot tube 67 is sleeved onto the lift arm pivot pin 38, which is retained in a vertical orientation within the clevis 24 and which, in cooperation with the pivot pin 38, forms a pivotal bearing for the lift arm 12 or 14 relative to the clevis 24 to enable pivoting about the respective pivot axis 63 or 65.

Figure 6:
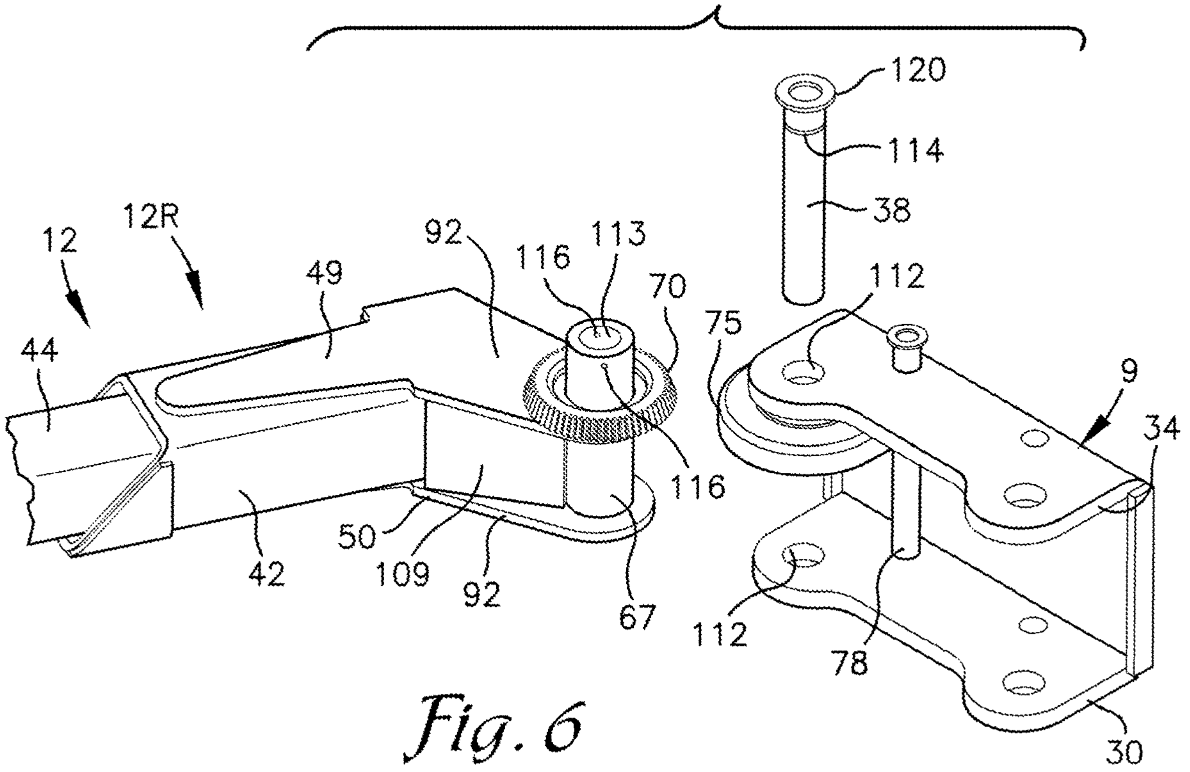
FIG. 6 is an enlarged exploded perspective view of the right-front lift arm illustrating removal of a pivot pin to enable separation of the arm from the right lift carriage of the lift system.

It is generally desirable to positively fix an angular position of the lift arms 12 and 14 to the carriage clevis 24, especially, prior to lifting a vehicle to prevent pivoting of the lift arms 12 and 14 about the respective pivot axis 63 and 65. The illustrated lift arms 12 and 14 each include a lift arm rotational lock mechanism or rotation lock 68 (FIGS. 3 and 4) engaged between the lift carriage 9 and the outer arm section 42 of the associated lift arm 12 and 14. The arm lock mechanism 68 is selectively releasable to enable pivoting each lift arm 12 and 14 about the respective pivot axis 63 and 65. In the illustrated system 1, the arm lock mechanism 68 of each of the lift arms 12 or 14 includes a rotatable lift arm pivot lock member or gear 70 secured to the outer arm section 42 in coaxially aligned relation to the pivot tube 67 and, thus, with the pivot pin 38 and respective pivot axis 63 or 65. As shown in FIG. 6, the rotatable lock gear 70 may be fixedly secured to the upper arm stiffener 49 of the outer arm section 42 and rotates about the pivot axis 63 or 65 as the lift arm 12 or 14 is pivoted. The illustrated rotatable gear 70 has the form of a circular spur gear with gear teeth projecting radially outward therefrom and spaced circumferentially about substantially an entire outer surface of the gear 70 or substantially 360 degrees about the rotatable lock gear 70.

The illustrated arm lock mechanism 68 includes a rotationally fixed lift arm pivot lock member or gear 75 which is engaged with the clevis 24 of the lift carriage 9. The illustrated lock gear 75 is slidably received on the pivot pin 38 in covering relation to the rotatable lock gear 70. The rotationally fixed gear 75 has an internal ring gear having a plurality of radially inwardly projecting rotationally fixed teeth from substantially an entire inner surface of an outer circumferential flange of the gear 75 or substantially 360 degrees about the rotationally fixed gear 75. The rotationally fixed gear 75 is sized and configured to compatibly mesh with rotatable gear 70 to prevent rotation thereof and, thereby, prevent rotation of the lift arm 12 or 14. The rotationally fixed gear 75 is resiliently urged toward the meshed position by a spring (not shown) engaged between the gear 75 and the top plate 34 of the carriage clevis 24.

Figure 4:
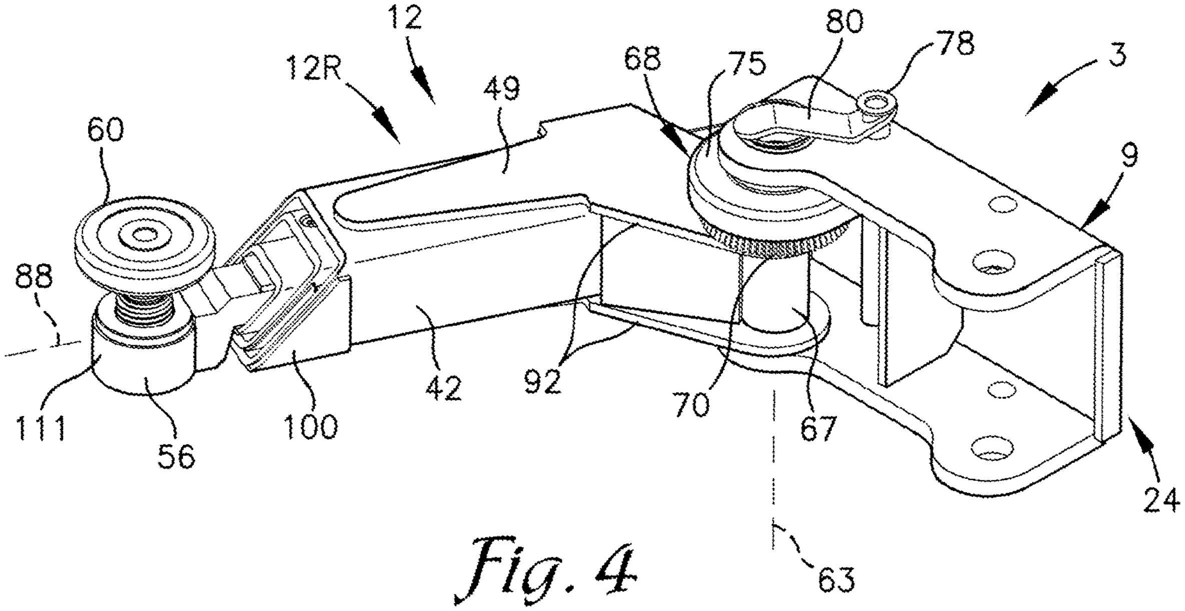
FIG. 4 is a view similar to FIG. 3 and illustrates a right-front offset lift arm assembly according to the present invention.

The illustrated rotationally fixed gear 75 has a mounting lug (not shown) which is slidably received onto a lock guide rod or lock pin 78 extending through the lug and positions the rotationally fixed gear 75 in radially spaced relation to the lock pin 78. The lock pin 78 is mounted on the clevis 24 for vertical reciprocating movement in relation thereto. Both the pivot pin 38 and the lock pin 78 are mounted on the clevis 24 such that lateral movement of both is prevented. Thus, rotation of the rotationally fixed gear 75 is prevented by its mounting on the pivot pin 38 and the lock pin 78. However, the rotationally fixed gear 75 is free to move axially along the pivot pin 38, to some degree. Relative movement of the fixed gear lug on the lock pin 78 is limited by means, such as a snap ring (not shown) on the lock pin 78, which limits downward movement of the fixed gear 75 therealong, whereby the fixed gear 75 can be selectively raised by raising the lock pin 78, as by use of a release lever 80 (FIG. 4). The release lever 80 engages an enlargement at an upper end of the lock pin 78.

Although the front and rear arms 12 and 14 are functionally similar, they are different in configuration, as will be described. Referring to FIGS. 1-4, the left and right rear arms 14 have respective rear longitudinal axis 86 along which sections of the arms telescopically extend and retract. The left and right front arms 12 have respective front longitudinal axis 88 along which sections of the arms extend and retract, as shown in FIG. 2. The longitudinal axes 86 of the rear arms 14 intersect or align with the respective rear pivot axes 65. Because of this, retraction of the middle arm sections 44 into the outer arm sections 42 and retraction of the inner arm sections 46 into the middle arm sections 44 is limited by contact of inner ends of the middle and inner arm sections 44 and 46 with the pivot structure of the rear arms 14, such as with pivot tubes 67 or pivot pins 38 (see FIGS. 1 and 2).

Figure 5:
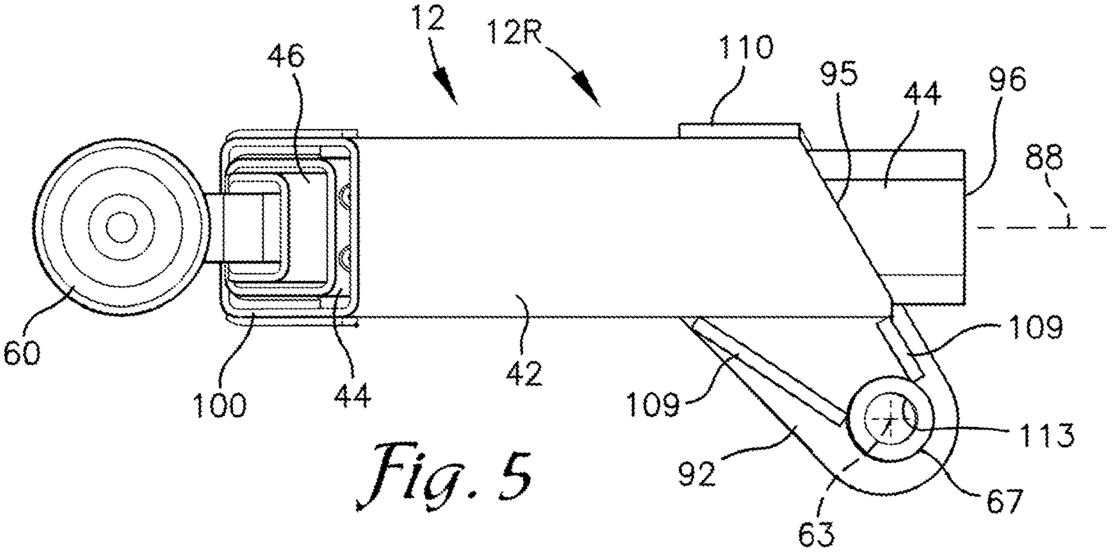
FIG. 5 is a further enlarged fragmentary top plan view of a right-front offset lift arm with an upper stiffener thereof removed to illustrate the offset position of a pivot tube relative to an outer section of the arm.

In contrast to the rear arms 14, the longitudinal axes 88 of the front arms 12 are radially offset from their corresponding pivot axes 63, as shown in FIG. 5. The outer arm sections 42 are pivotally engaged with the lift carriage 9, near proximal ends 95 of the outer arm sections 42, at a radially offset distance from the pivot axes 63 about which the outer arm sections 42 pivot. Referring to FIGS. 3-6, the upper and lower stiffeners 49 and 50 are provided with offset extensions or pivot support members or ears 92 which position the outer arm section 42 of each front arm 12 at a radially offset distance from the respective pivot axis 63 of the front arm 12. The ears 92 extend from the outer arm section 42 at an angle and engage the pivot pin 38 to enable pivoting of the outer arm section 42 about the respective pivot axis 63.

Additionally, a proximal end 95 of the outer arm section 42 is open whereby a proximal end 96 of the middle arm section 44 can be retracted past the pivot tube 67 of the front arm 12 and protrude through the proximal end 95 of the outer arm section 42. In one embodiment, the proximal end 96 of the middle arm section 44 extends out of the proximal end 95 of the outer arm section 42 when the middle arm section 44 is fully retracted through the outer arm section 42. In one embodiment the middle arm section 44 is longer than the outer arm section 42. In a similar manner, a proximal end 97 of the inner arm section 46 may also be retracted past the pivot tube 67 and out the proximal end 95 of the outer arm section 42. As a result, the middle and inner arm sections 44 and 46, respectively, can be retracted past the proximal end 95 of the outer arm section 42, as limited by engagement of internal retraction stops. The internal retraction stops are shown if FIG. 13. The middle arm section internal retraction stops include screw stops or stop members 99 that extend inward from an internal surface of an open distal end 100, opposite the proximal end 95 of the outer arm section 42, and engage distal side abutments 101 that extend outward from the distal end 102 of the middle arm section 44 to limit retraction of the middle arm section 44 relative to the outer arm section 42. In one embodiment, the stop members 99 are screws that extend through the sides of outer arm section 42 and the distal side abutments 101 are plates secured to the sides of the distal end 102 of the middle arm section 44. The inner arm section 46 is limited in retraction by an adapter arm or retraction shoulder 103 extending from and secured to the distal end 52 of the inner arm section 46 from which the lift pad adapter 56 extends. The adapter arm 103 is angled or curved in a downward direction such that when the inner arm section 46 is retracted, the adapter arm 103 limits retraction of the inner arm section 46 by engaging with the distal end 100 of the outer arm section 42 or the distal end 102 of the middle arm section 44.

Figure 13:
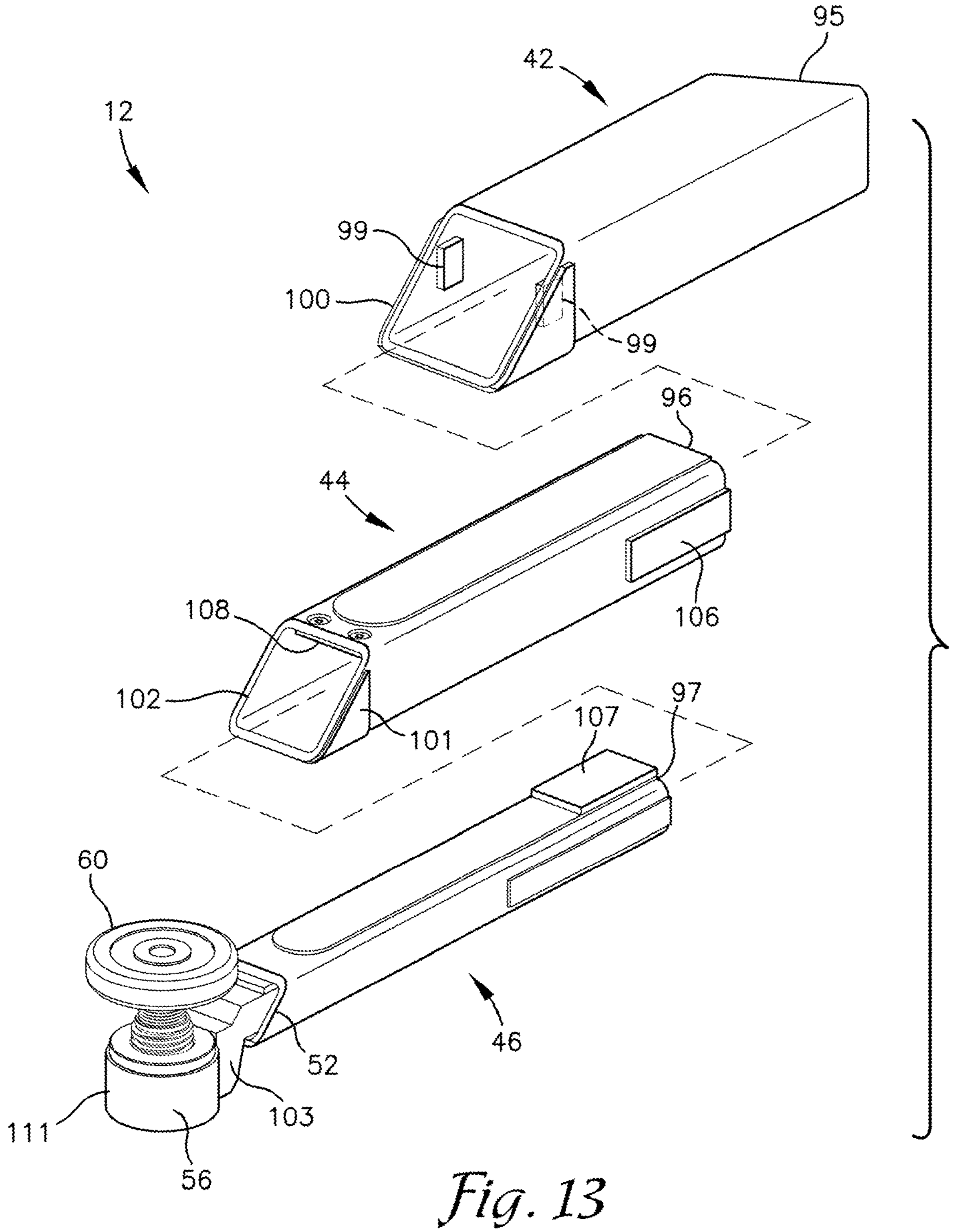
FIG. 13 is an exploded view of the right-front offset lift arm assembly as shown in FIG. 4, showing the internal retraction and extension stops, according to the present invention.

Conversely, the middle and inner arm sections 44 and 46 of front lift arms 12, and similarly the rear lift arms 14, can be extended out of the outer arm section 42 through the distal end 100 thereof until internal extension stops are engaged. The internal extension stops are shown in FIG. 13. The extension stops include proximal end abutments 106 extending outward from a proximal end 96 of the middle arm section 44 and an inner arm guide 107 extending outward from the proximal end 97 of the inner arm section 46. The stop members 99 extending inward from the outer arm section 42 engage the proximal end abutments 106 extending outward from the sides of the proximal end 96 of the middle arm section 44 to limit the extension of the middle arm section 44 relative to the outer arm section 42. A slide stop 108 extending downward from an inside surface of the distal end 102 of the middle arm section 44 engages the inner arm guide 107 extending from the top of the proximal end 97 of the inner arm section 46 to limit the extension of the inner arm section 46 relative to the middle arm section 44. Thus, the offset lift front arms 12 can be extended to an extent similar to the rear lift arms 14, with appropriate overlap. And, according to the present invention, the offset front arms 12 can be retracted to a greater degree than the rear lift arms 14 which are not radially offset from their pivot axes 65 since sections of the front arms 12 are not limited by engagement with the pivot tubes 67 or pivot pins 38.

Referring to FIG. 5, the illustrated offset lift arm 12 has the pivot tube 67 extending between the offset ears 92. The ears 92 may be reinforced by gussets 109 joined, as by welding, to sidewalls of the outer arm section 42, the stiffeners 49 and 50, and the pivot tube 67. Each front arm 12 may also be provided with an end gusset 110 joined to the sidewall of the arm 12 on the opposite side from the pivot tube 67 and side surfaces of the stiffeners 49 and 50.

Figure 3:
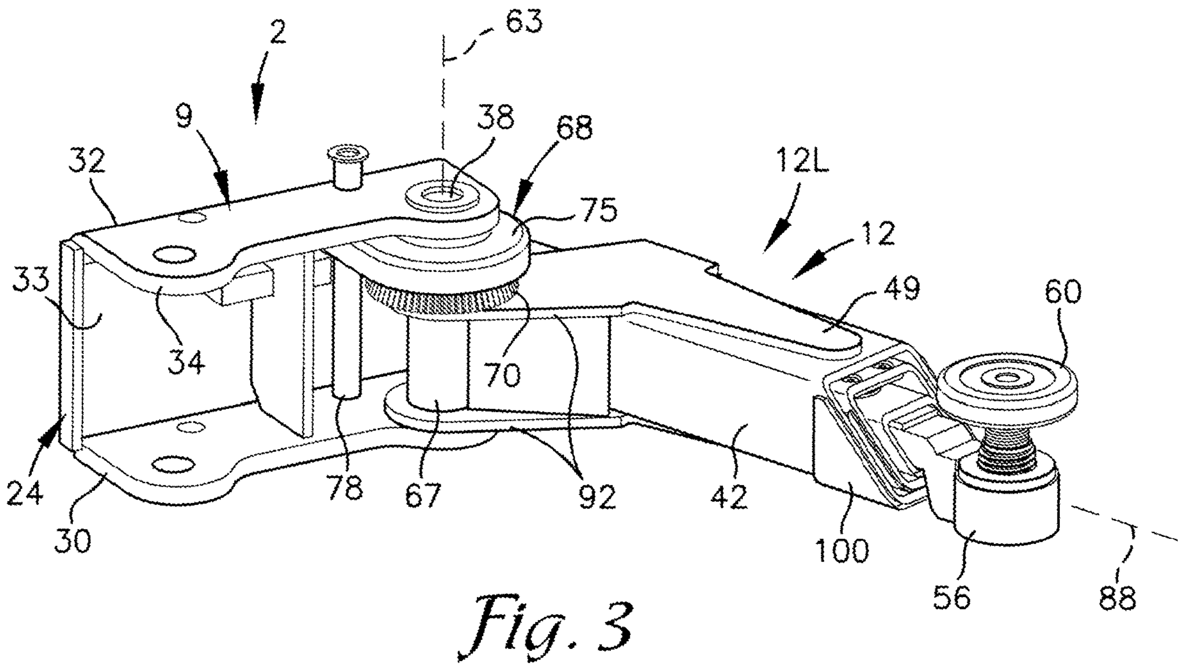
FIG. 3 is an enlarged fragmentary perspective view illustrating a left-front offset lift arm assembly according to the present invention, shown in a fully retracted condition.

FIG. 4 illustrates the front lift arm 12 mounted on the carriage clevis 24 of the lift carriage 9 of the right lift unit 3 of the lift system 1. From a distal end 111 of the arm 12, at the lift pad 60 thereof, the pivot axis 63 of the arm 12 is offset to the right of the longitudinal axis 88 of the arm 12. Thus, the configuration of the arm 12 shown in FIG. 4 can be referred to as a right-offset lift arm 12R. In a similar manner, the pivot axis 63 the front lift arm 12 on the left lift unit 2, shown in FIG. 3, is offset to the left of the longitudinal axis 88 thereof, and will be referred to as a left-offset lift arm 12L. As viewed from above in FIG. 2, the left-offset arm 12L and the right-offset arm 12R are substantially mirror-images of one another. That is, they are bilaterally symmetrical to one another.

Figures 7, 8:
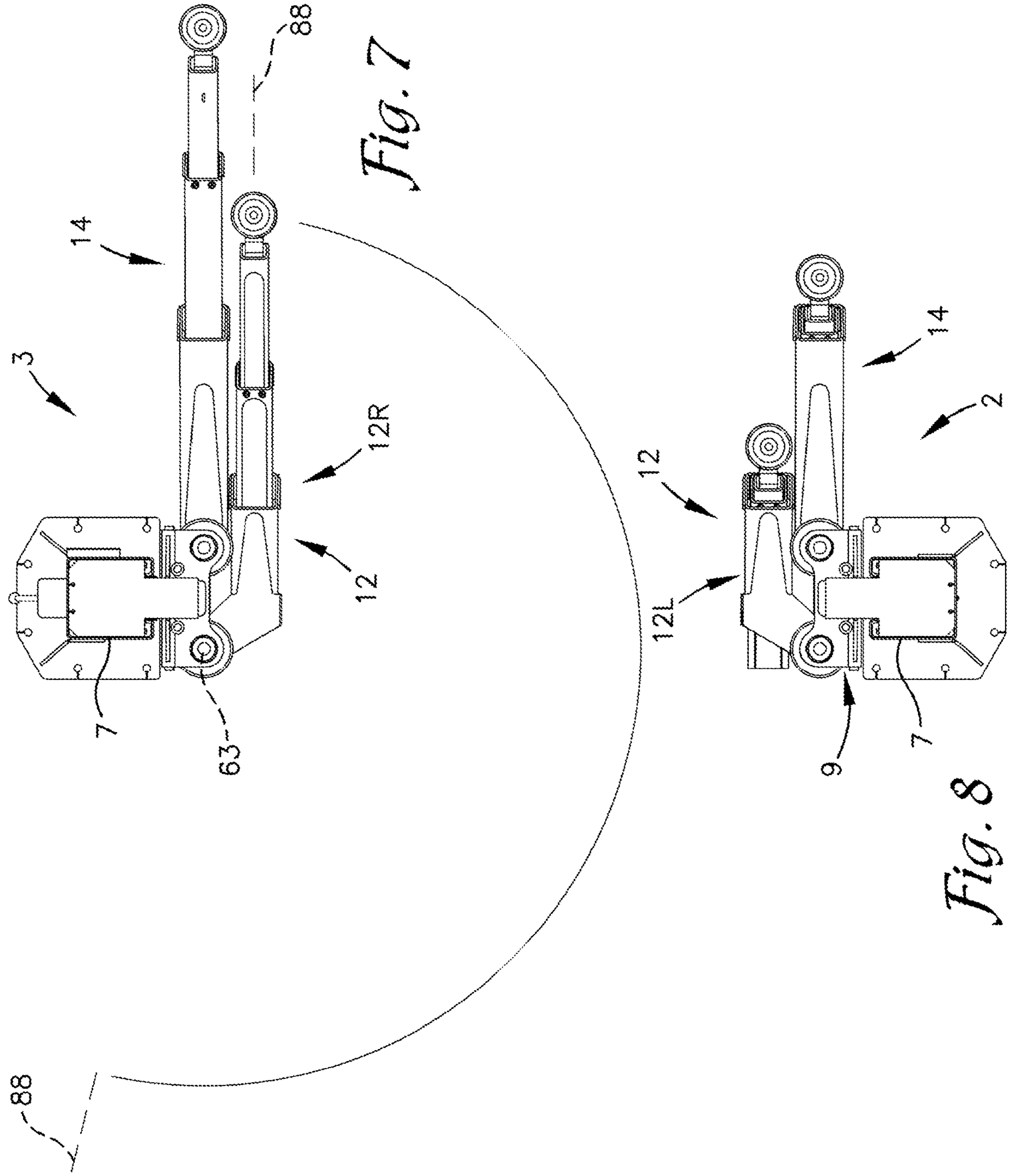
FIG. 7 is a fragmentary top plan view, at a reduced scale, of a right lift unit of the lift system showing a range of pivoting of the right-offset lift arm when installed on the right lift carriage.
FIG. 8 is a view similar to FIG. 7 and shows the left lift unit with a left-offset lift arm on the left lift unit in a fully retracted condition.
Figure 9:
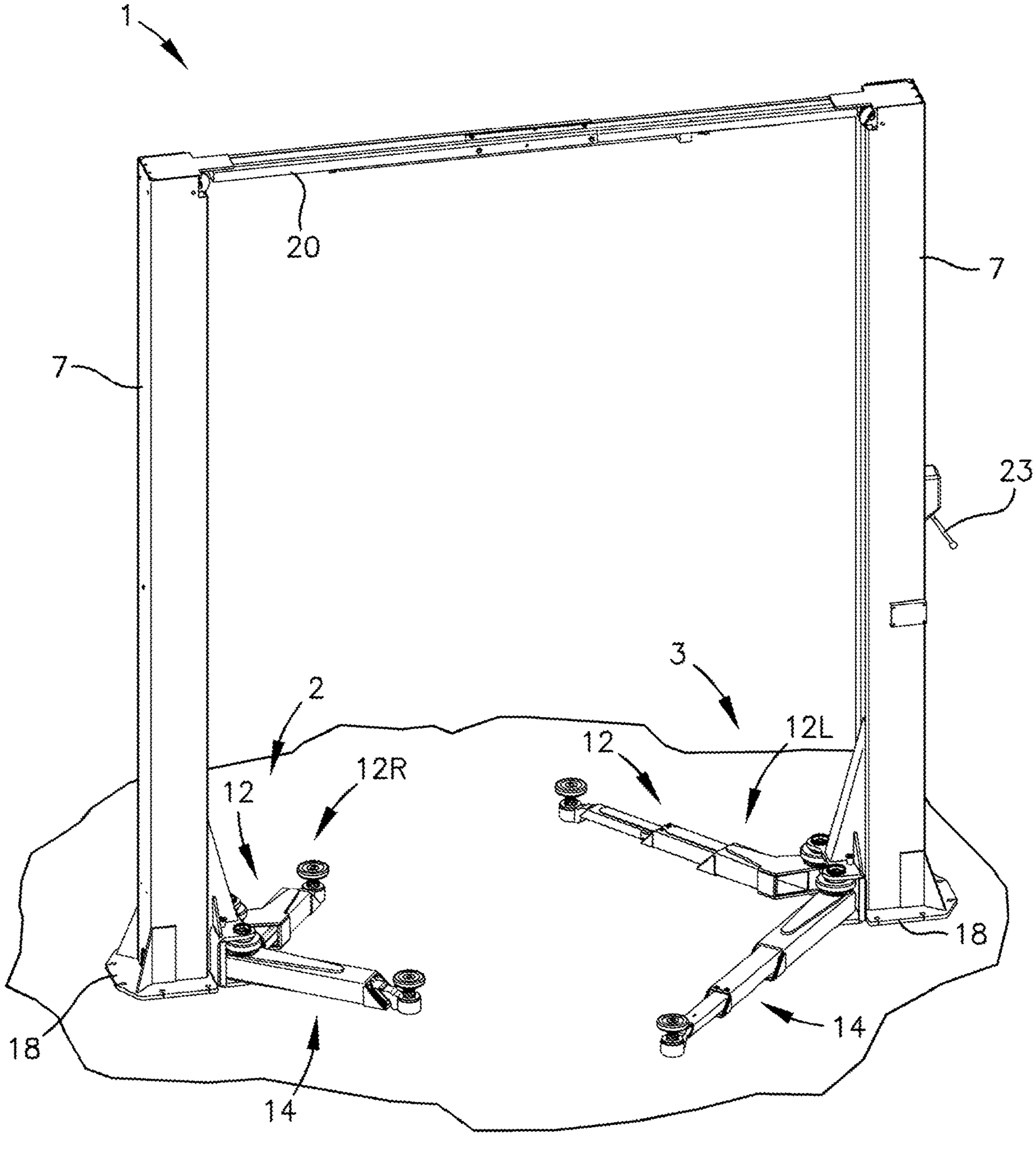
FIG. 9 is a perspective view of the two-post lift system with front offset lift arms according laterally swapped so that the right-offset lift arm is installed on the left lift unit and a left-offset lift arm is installed on the right lift unit.

Pivoting motion of the lift arms 12 and 14 is limited by engagement of components of the arms with components of their respective lift carriages 9 and with the opposite arm mounted on a given lift carriage 9. When a vehicle is to be lifted by the lift system 1, the front and rear arms 12 and 14 are usually pivoted respectively toward the front and rear directions of the post 7 on which they are mounted to enable the vehicle to be driven between the posts 7. Then the lift arms 12 and 14 are pivoted and extended or retracted to reach lift points beneath the vehicle. Because of the great variation in vehicles which might be dealt with and the possible presence of obstructions on the undersides of the vehicles, it is sometimes difficult to maneuver the lift pads 60 to their desired locations. Offsetting the pivot axes 63 of the front lift arms 12 a sufficient distance enables the front lift arms 12 to be pivoted into approximate parallel relation with the corresponding rear lift arm 14 on a given lift carriage 9, as shown in FIGS. 7 and 8. By positioning the front lift arms 12 in this manner, the vehicle can be positioned between the lift units 2 and 3 and the front arms 12 pivoted beneath the vehicle from a rear to front direction. FIG. 7 illustrates the approximate angular range of the offset front lift arms 12.

It is foreseen that it might be desirable to perform some services on or toward the front end of a vehicle prior or subsequent to lifting the vehicle. In such a situation it may be desirable to retract the front lift arms 12 and pivot them out of the way. FIGS. 9-12 illustrate the vehicle lift system 1 with the front lift arms 12 laterally swapped so that the left-offset arm 12L is mounted on the right lift unit 3 and the right-offset arm 12R installed on the left lift unit 2. FIG. 11 illustrates the approximate pivoting range of the front arms 12 in the swapped or reversed locations which illustrates that the front lift arms 12 can be pivoted to significant angles away from a vehicle located between the lift units 2 and 3, to provide access to the vehicle when not in a lifted position.

Figure 10:
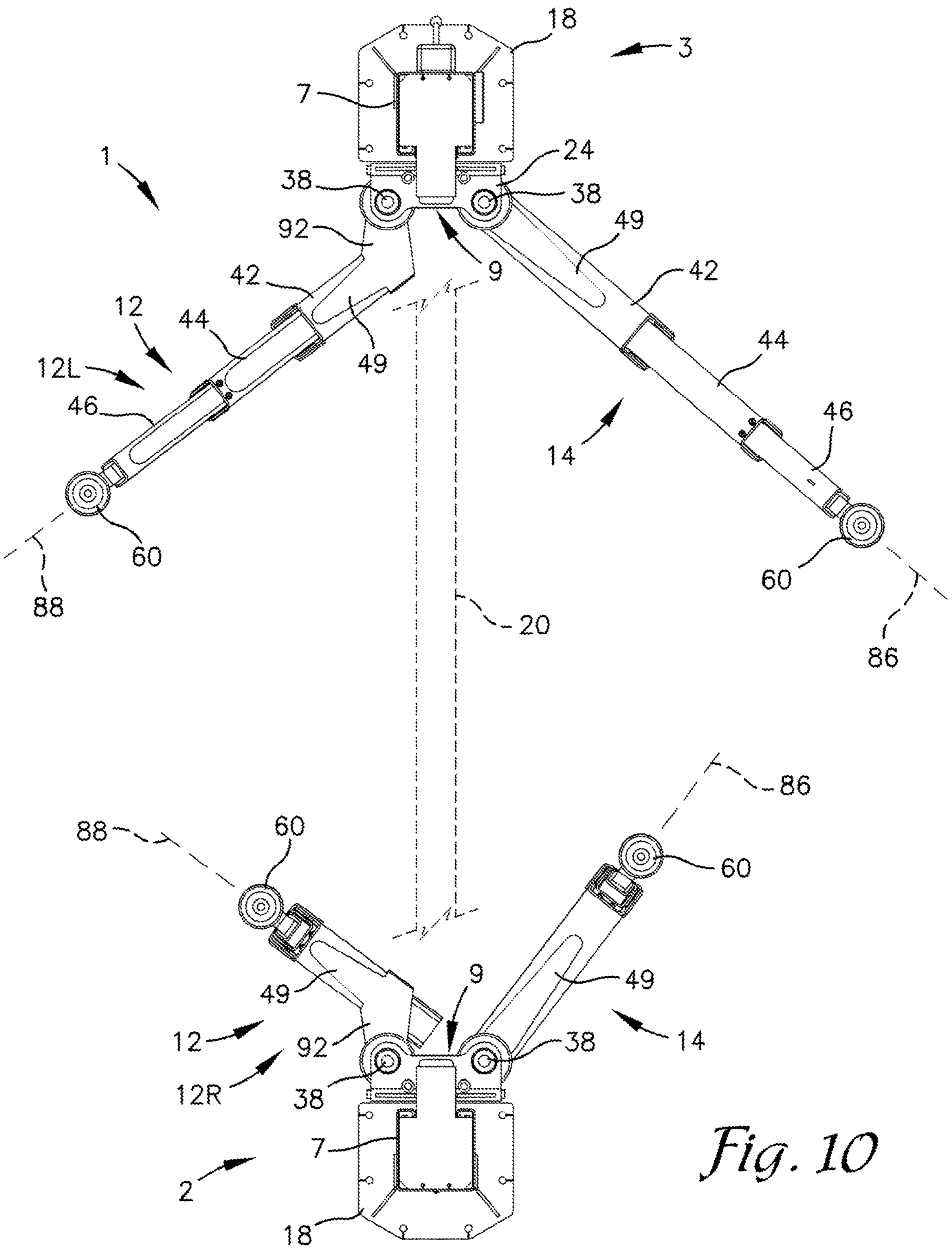
FIG. 10 is an enlarged fragmentary plan view of the lift system with the trough assembly removed and illustrating the front lift arms in the swapped condition.
Figure 11:
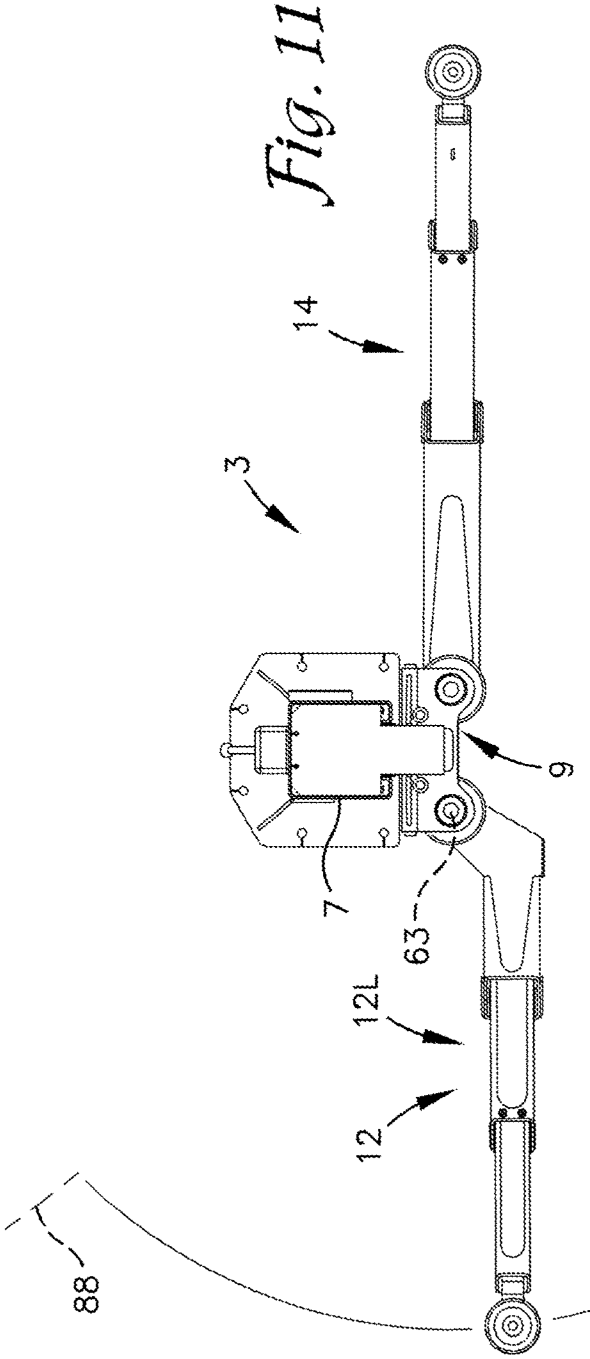
FIG. 11 is a fragmentary top plan view, at a reduced scale, of a right lift unit with the left-offset lift arm installed thereon and illustrates a range of pivoting motion of the left-offset arm installed on the right lift unit.
Figure 12:
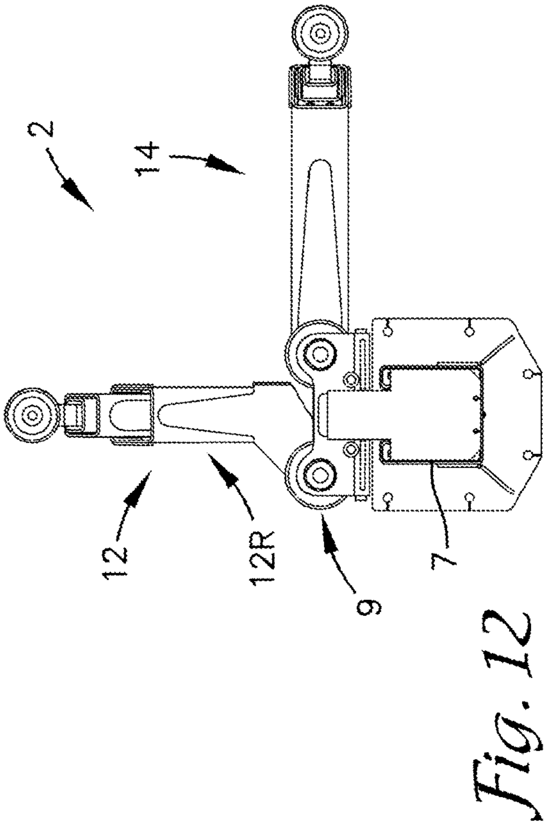
FIG. 12 is a view similar to FIG. 11 and shows the right-offset lift arm installed on the left lift unit in a fully retracted condition.

While it would be possible to provide lift systems 1 with the front lift arms 12 permanently installed either in the configuration shown in FIG. 2 or the swapped or reversed configuration shown in FIG. 10, the present invention provides means to enable selective removal of the arms 12 from their respective lift carriages 9, laterally swapped, and reinstalled on the opposite side.

FIG. 6 illustrates an embodiment of a telescoping offset front lift arm 12 which is configured to enable removal and replacement of the lift arm 12 from the lift carriage 9. The pivot pin 38 is electively removable from engagement with the outer arm section 42 of the lift arm 12 and the lift carriage 9 and configured to enable removal of the lift arm 12 from the lift carriage 9. More specifically, the lift arm 12 is pivotally connected to the lift carriage 9 by means of the pivot pin 38 which extends through aligned pivot pin bores or openings 112 formed through the bottom plate 30 and the top plate 34. The pivot pin 38 passes through a bore 113 extending through the pivot tube 67 and through the rotationally fixed lock gear 75. The pivot pin 38 has a circumferential groove 114 which aligns with one or more tapped set screw bores 116 formed through the cylindrical wall of the pivot tube 67. Set screws (not shown) are threaded through the bores 116 and engage the groove 114 to maintain the axial position of the pivot pin 38 in the pivot tube bore 113 without interfering with pivoting of the lift arm 12. The set screws in the bores 116 are accessible when the stationary lock gear 75 is lowered into engagement with the rotatable lock gear 70. In order to release the lift arm 12 from the lift carriage 9 for swapping, the set screw or screws are released from the groove 114, the pivot pin 38 is lifted out of pivot tube 67 and the carriage bores 112, and the lock gear 75 is raised out of engagement with the lock gear 70. The pivot pin 38 may be provided with an enlargement 120, such as a washer secured to a top end of the pivot pin 38 to facilitate removal of the pivot pin 38 and properly position the groove 114 when the pivot pin 38 is reinstalled. Reinstallation of the front lift arms 12 on the opposite lift units 2 and 3 is accomplished by reversing the order of steps to remove the arms.

It is to be understood that while certain forms of the present invention have been illustrated and described herein, it is not to be limited to the specific forms or arrangement of parts described and shown.

What is claimed and desired to be secured by Letters Patent is:

1. A method of operating a two post vehicle lift system including upstanding, laterally spaced left and right lift posts, each post having a respective lift carriage slidably engaged therewith and movable therealong, the lift carriages having corresponding first ends on a first side of the left and right lift posts and corresponding second ends on an opposite second side of the lift posts, and comprising the steps of:

forming a pair of offset lift arms having respective pivot axes from which the lift arms are radially offset by respective offset extensions connected to the offset lift arms at respective proximal ends thereof and having respective distal ends configured to engage a vehicle frame of a vehicle to be lifted;

providing a pair of second lift arms having respective proximal ends and respective distal ends configured to engage the vehicle frame;

pivotally connecting the proximal ends of the second lift arms respectively to the second ends of the lift carriages;

connecting proximal ends of the offset lift arms respectively to the first ends of the lift carriages to enable pivoting of the offset lift arms through respective first pivotal ranges; and laterally swapping the offset lift arms and connecting the proximal ends thereof respectively to the first ends of the lift carriages to enable pivoting of the offset lift arms through respective second pivotal ranges which thereby extends the respective total pivotal ranges of the offset lift arms.

2. A method as set forth in claim 1 wherein each of the offset lift arms and the second lift arms are formed of respective telescoping sections to enable extension and retraction thereof, and including the step of:

selectively pivoting, extending, and retracting the offset lift arms and the second lift arms to enable selective location of the respective distal ends thereof in relation to the vehicle frame.

3. A method as set forth in claim 1 and including the steps of:

pivotally connecting each of the offset lift arms to the lift carriage using a respective removable pivot member;

removing each pivot member to enable disconnection of the associated offset lift arm from its lift carriage;

laterally swapping the offset lift arms; and replacing each pivot member to thereby reconnect each offset lift arm to its opposite lift carriage.

4. A method of operating a two post vehicle lift system including upstanding, laterally spaced left and right lift posts, each post having a respective lift carriage slidably engaged therewith and movable therealong, the lift carriages having corresponding first ends on a first side of the left and right lift posts and corresponding second ends on an opposite second side of the lift posts, and comprising the steps of:

forming a pair of offset telescoping lift arms having respective pivot axes from which the lift arms are radially offset by respective offset extensions connected to the offset lift arms at respective proximal ends thereof and having respective distal ends configured to engage a vehicle frame of a vehicle to be lifted;

providing a pair of second telescoping lift arms having respective proximal ends and respective distal ends configured to engage the vehicle frame;

pivotally connecting the proximal ends of the second lift arms respectively to the second ends of the lift carriages using respective removable pivot members;

connecting proximal ends of the offset lift arms respectively to the first ends of the lift carriages using respective removable pivot members to enable pivoting of the offset lift arms through respective first pivotal ranges;

selectively pivoting, extending, and retracting the offset lift arms and the second lift arms to enable selective location of the respective distal ends thereof in relation to the vehicle frame;

removing each pivot member to enable disconnection of the associated offset lift arm from its lift carriage;

laterally swapping the removed offset lift arms to corresponding ends of the opposite lift carriages; and replacing each pivot member to thereby reconnect each offset lift arm to its opposite lift carriage to thereby extend the respective total pivotal ranges of the offset lift arms.

* * * * *